J. PRICE.
Wheel-Cultivator.
No. 59,262.
Patented Oct. 30, 1866.
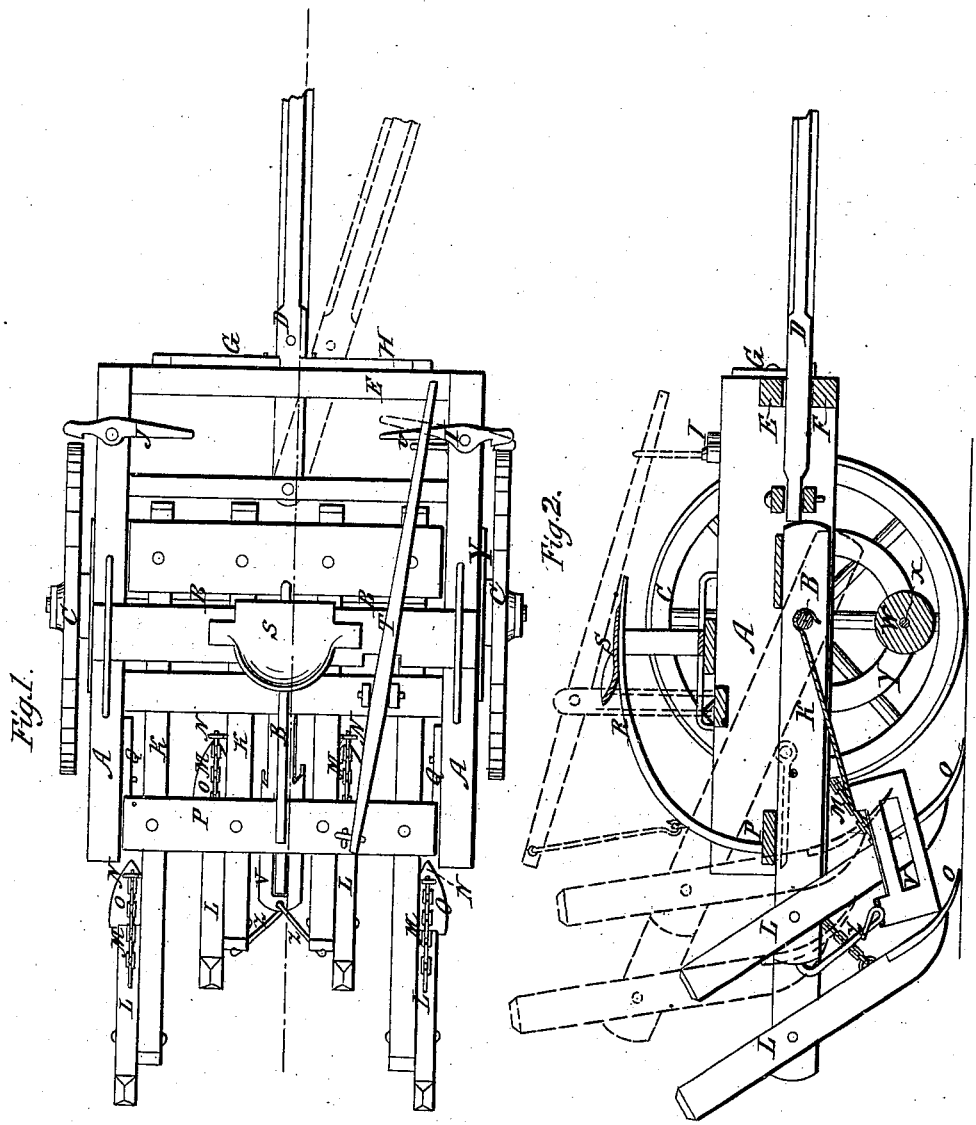
Witnesses:
Edward H. Knight
Jas. L. Ewin
Inventor:
Jackson Price
By Munn & Co.
Attys

UNITED STATES PATENT OFFICE.

JACKSON PRICE, OF GREENFIELD, INDIANA.

IMPROVEMENT IN PLOWS.

Specification forming part of Letters Patent No. 59,262, dated October 30, 1866.

*To all whom it may concern:*

Be it known that I, JACKSON PRICE, of Greenfield, in the county of Hancock and State of Indiana, have invented a new and Improved Corn-Plow; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a plan or top view. Fig. 2 is a central vertical longitudinal section on the line $xx$, Fig. 1.

This machine is intended for the plowing of corn or other crops, and for laying off ground in rows for planting.

The improvements are in the attachment of the tongue, the springs above the plow-frame to steady its action, and the brake-levers to assist in turning.

In the drawings, A is the frame of the machine, resting upon the axle B and wheels C. The tongue D is pivoted by a vertical bolt to the frame, so as to have an adjustment in a horizontal plane, the bars E F being, respectively, above and below it, and the pivoted pieces G H retaining it in the central position (black lines, Fig. 1) when the plow is moving straight ahead.

On the frame are foot-levers I J, which are arranged conveniently for operation by the feet of the driver. Their purpose is to brake the wheel on the side toward which the plow is being turned, so as to enable it to turn on that wheel as a center while the other revolves.

The turning is facilitated by the adjustment of the tongue, (see red lines, Fig. 1,) the latch G being raised, allowing the tongue to rotate toward the off side, in which position the draft of the team will turn it short round, instead of describing a circuit with both wheels, the brake-lever L, in red lines, showing the off wheel locked, so as to form the pivot on which the plow turns.

The plow-frame K is pivoted to the axle and the standards L to the frame, draft-chains M, stapled to the standards and linked over the hooks N on the frame K, serving to maintain the plows O at the required height and inclination. If a plow should get fast on a root or stone, it may be disengaged by unhooking and allowing it to vibrate backward and drag over it.

The cross-bar P on the frame K rests upon the springs Q, which are attached to the frame A. Their purpose is to ease the motions of the plow-frame K by making an elastic support for it. The spring R above the frame, which passes from thence under the seat S, tends to prevent jumping or bouncing of the plow in passing over uneven ground.

The plow-frame K is raised, as occasion may require, by means of the lever T, and retained in that position by the hook U.

The seat S is made adjustable forward and backward, so as to preserve the proper balance and trim the weight to advantage for the comfort of the team and the conduct of the work.

The frame V between the two middle plows is suspended by rods Z Z, and is intended to keep clods from the corn while yet small. It is detached and laid aside when the corn gets large or when running out rows.

The roller W on a shaft, X, and suspended by hangers Y beneath the axle, is used, as occasion requires, for pulverizing the clods in the row.

Having described my invention, what I claim therein as new, and desire to secure by Letters Patent, is—

1. The arrangement of the plow-frame K and springs Q R, for regulating its motion, substantially as described.

2. The pivoted tongue D and latches G H, operating substantially as described.

3. The foot-levers I J, in combination with the tongue D and latches G H, operating substantially as described.

To the above specification of my improvement in plows I have signed my hand.

JACKSON PRICE.

Witnesses:
J. J. CRIDER,
A. W. HOUGH.